March 24, 1936.  B. McC. TRUITT  2,034,965
ATTACHMENT FOR AUTOMOBILES
Filed April 28, 1934  7 Sheets-Sheet 3

Inventor
Bertha McCafferty Truitt.
By Lacey & Lacey, Attorneys

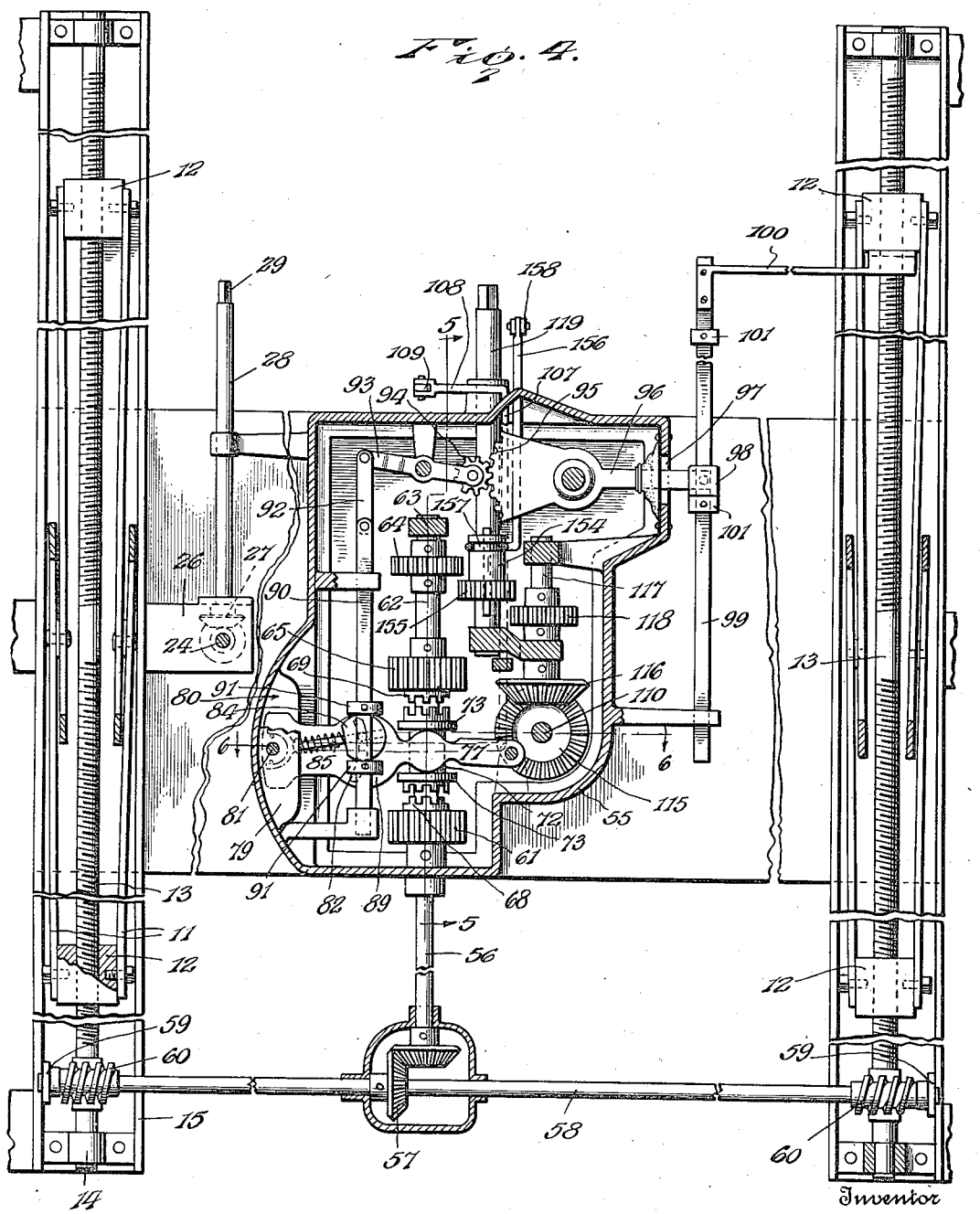

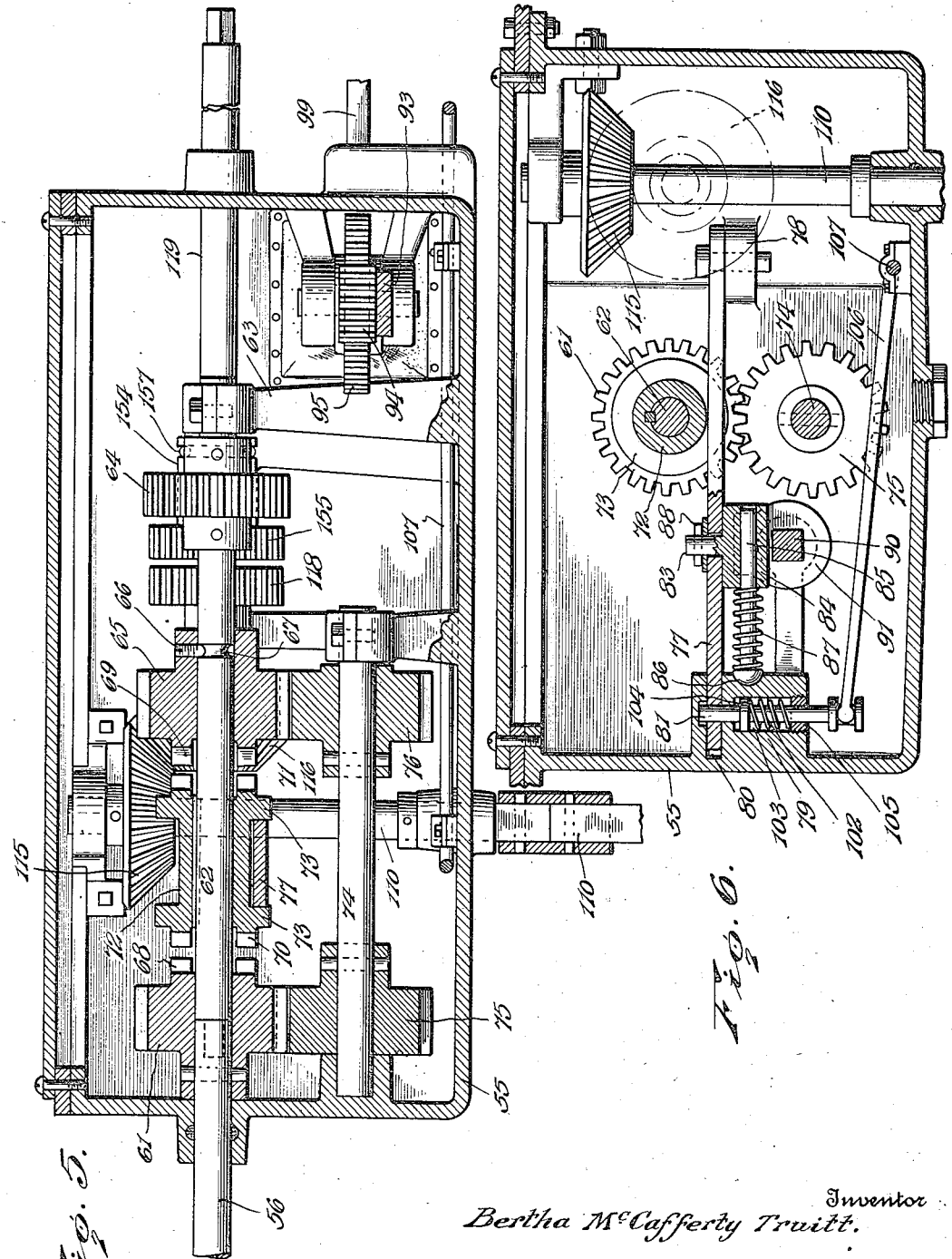

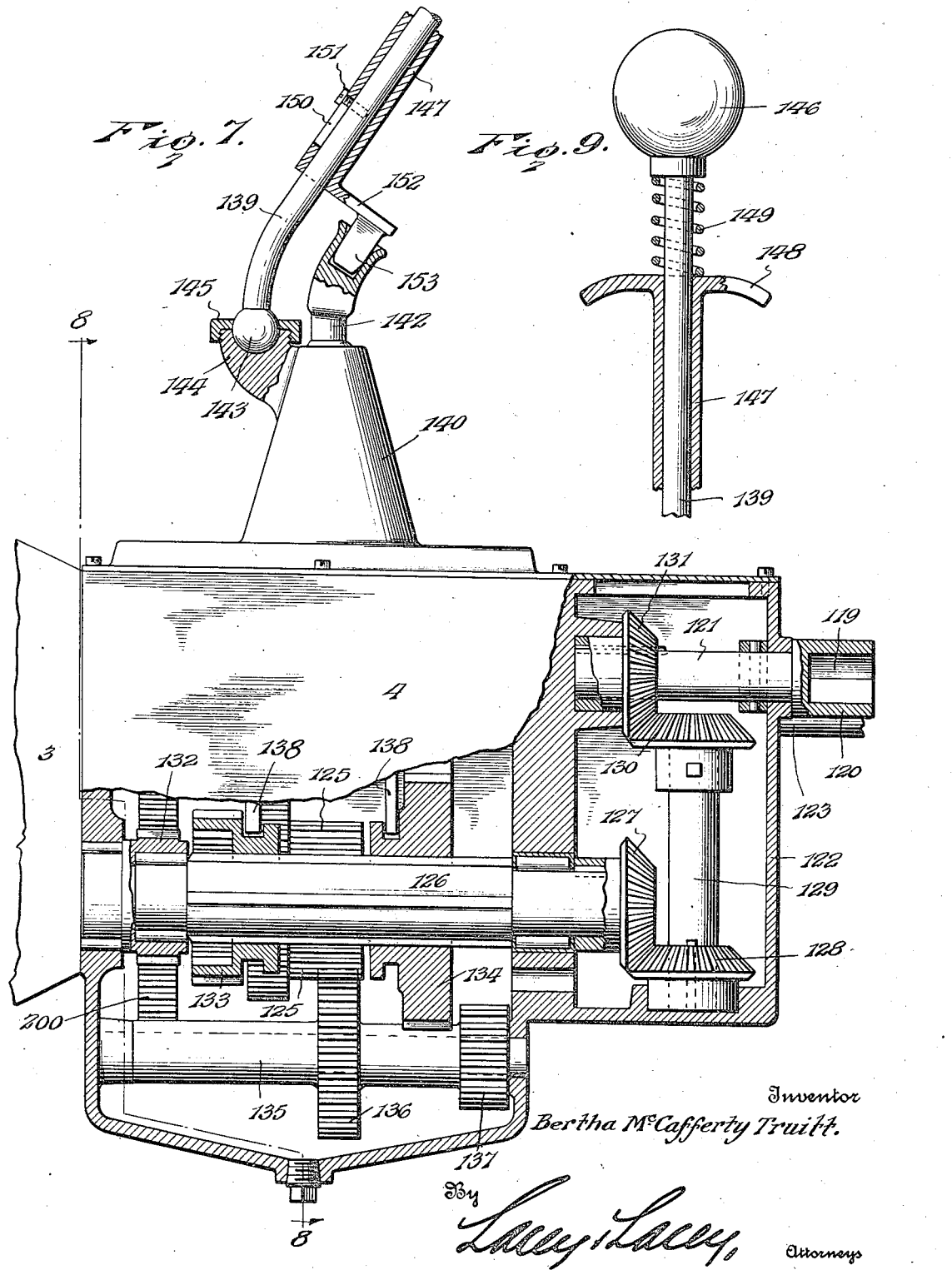

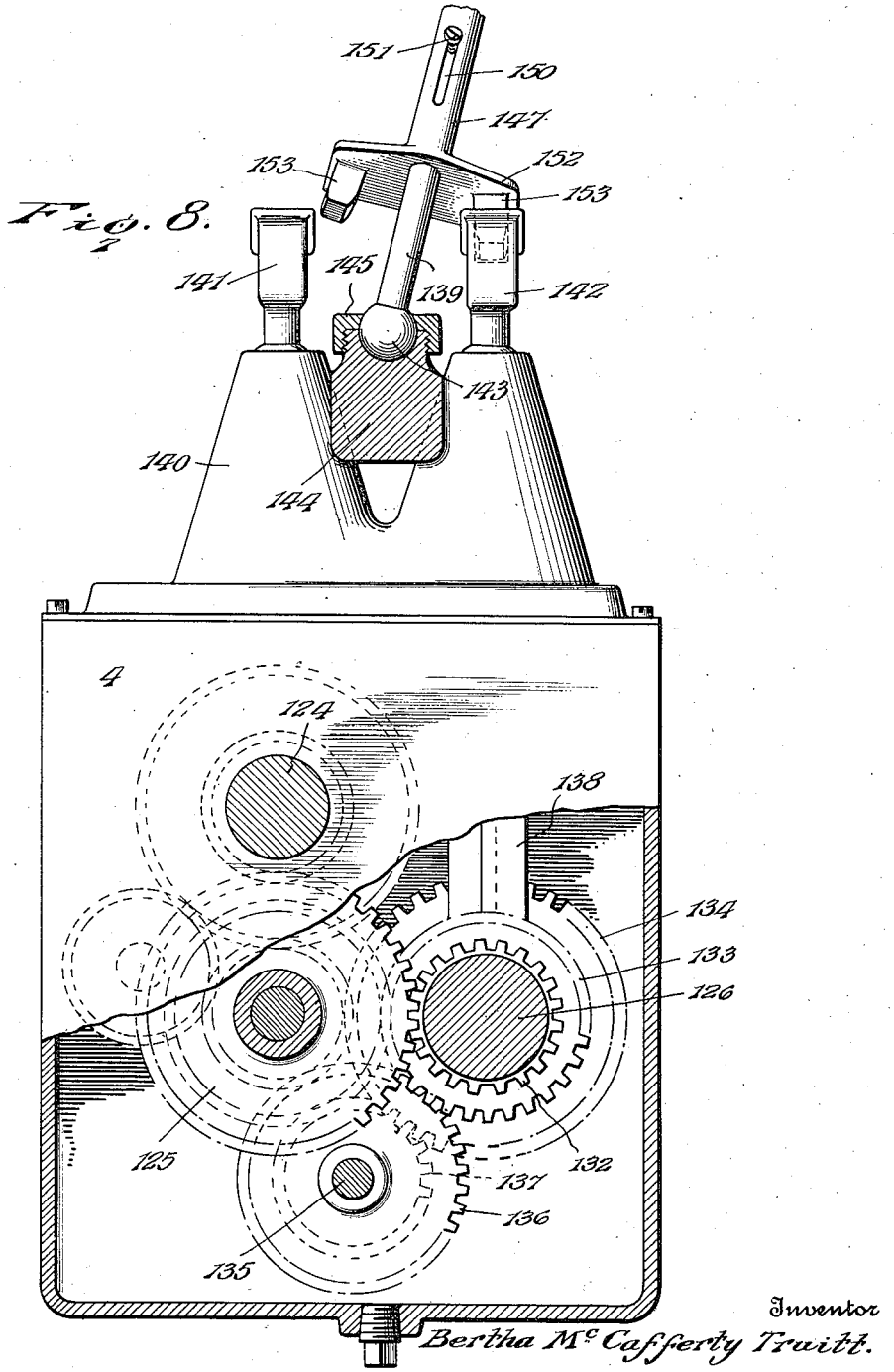

Patented Mar. 24, 1936

2,034,965

UNITED STATES PATENT OFFICE 2,034,965

ATTACHMENT FOR AUTOMOBILES

Bertha McCafferty Truitt, Calumet, Okla.

Application April 28, 1934, Serial No. 722,945

9 Claims. (Cl. 180—1)

The primary object of this invention is to provide means which may be mounted upon a motor vehicle and operated by the power of the engine of the vehicle to raise the vehicle from the ground whenever the occasion may arise. It is also an object of the invention to provide means whereby the power of the engine may be utilized to effect sidewise travel of the vehicle so that it may be readily parked within a crowded space. It is also an object of the invention to provide means whereby, when the vehicle is raised, it may be easily steered in any desired direction and upon arriving in a desired location be held against further travel. Other objects of the invention will appear incidentally in the course of the following description and the invention resides in certain novel features which will be particularly defined in the claims following the description.

In the accompanying drawings, which illustrate one embodiment of the invention:

Figure 4 is a horizontal section on the line 4—4 of Figure 3.

Figure 5 is a section on the line 5—5 of Figure 4.

Figure 6 is a section on the line 6—6 of Figure 4.

Figure 7 is a view, partly in section and partly in elevation, of the transmission whereby the power of the engine is utilized to raise and lower the vehicle and to effect travel of the same while it is raised.

Figure 8 is a section on the line 8—8 of Figure 7.

Figure 9 is a detail view of a part of the gear-shifting mechanism.

Figure 11 is a detail view of a part of the steering mechanism.

The automobile, indicated conventionally at 1, may be of any approved or known design, an internal combustion engine 2 being mounted upon the chassis of the automobile, the usual clutch casing being indicated at 3 and the transmission housing being indicated at 4.

Figure 1:
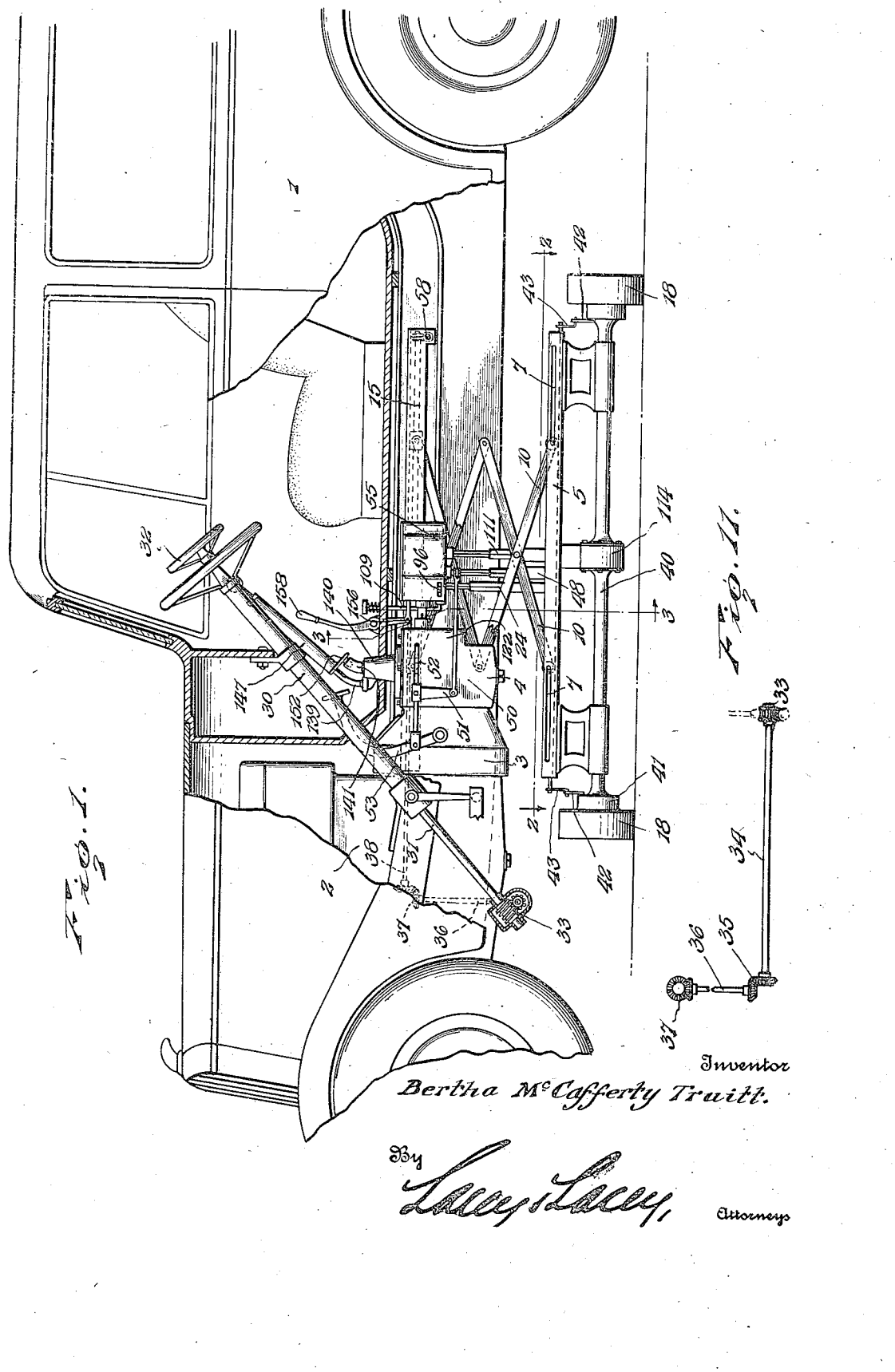
Figure 1 is a view, partly in side elevation and partly in section, of a motor vehicle having my invention applied thereto.
Figure 3:
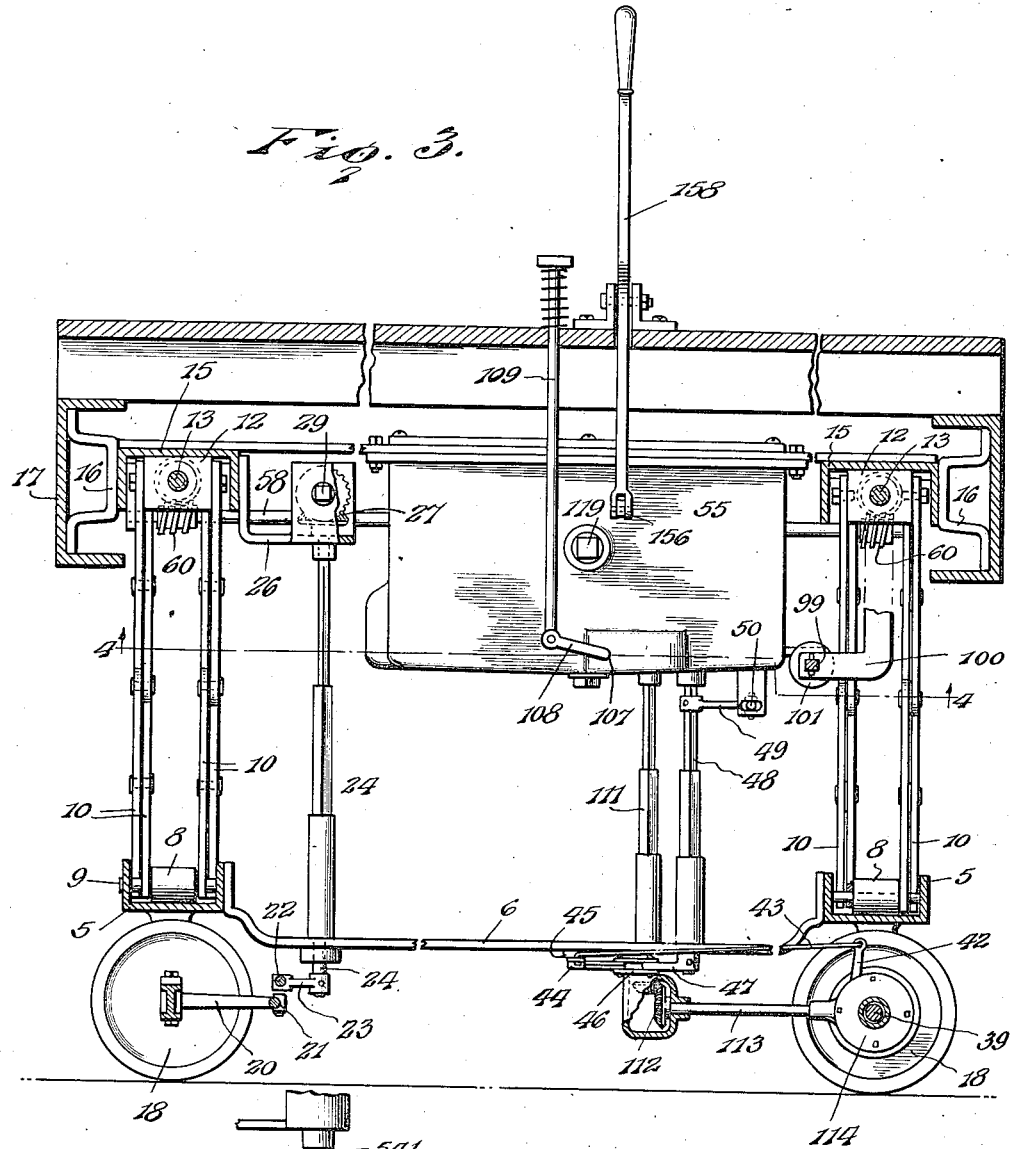
Figure 3 is a transverse section on the line 3—3 of Figure 1.

In carrying out the present invention, there is provided a truck consisting of side bars 5 connected by cross bars 6, the side bars 5 being channels, as clearly shown in Figure 3, and being provided in their upstanding flanges with longitudinal slots 7. Mounted in each side bar are rollers 8 disposed between the flanges of the channel bars and carried by pins 9 which have their ends engaged through the slots 7, as shown. Pivotally mounted upon the pins 9 are the lower ends of links 10 which form members of a lazy tongs, shown clearly in Figure 1. The uppermost links of the lazy tongs, indicated at 11, are pivoted to the sides of nuts 12 which are fitted upon worm shafts or threaded rods 13 disposed longitudinally of the vehicle and mounted at their ends in bearings 14 which are secured to the ends of upper channel bars or beams 15. These beams 15 are firmly secured at their ends by welding or riveting to brackets 16 which, in turn, are riveted or otherwise firmly secured to the sills 17 of the chassis. Upon reference to Figure 4, it will be noted that the opposite ends of the shafts or rods 13 are reversely threaded and, therefore, when they are rotated the nuts 12 engaged therewith will be caused to travel toward or from each other, this travel causing the lazy tongs to expand or contract, according to the direction of the movement. Extension or unfolding of the lazy tongs will, of course, cause the truck to be lowered from the body of the vehicle, while collapse of the lazy tongs will lower the vehicle to run upon its own wheels, as will be understood. Rollers or small wheels 18 are provided at the corners of the truck and will make contact with the ground, as shown in Figure 1, when the truck is lowered, the vehicle being thereby raised from the ground and supported upon said rollers 18 for travel in a general sidewise direction.

Figure 2:
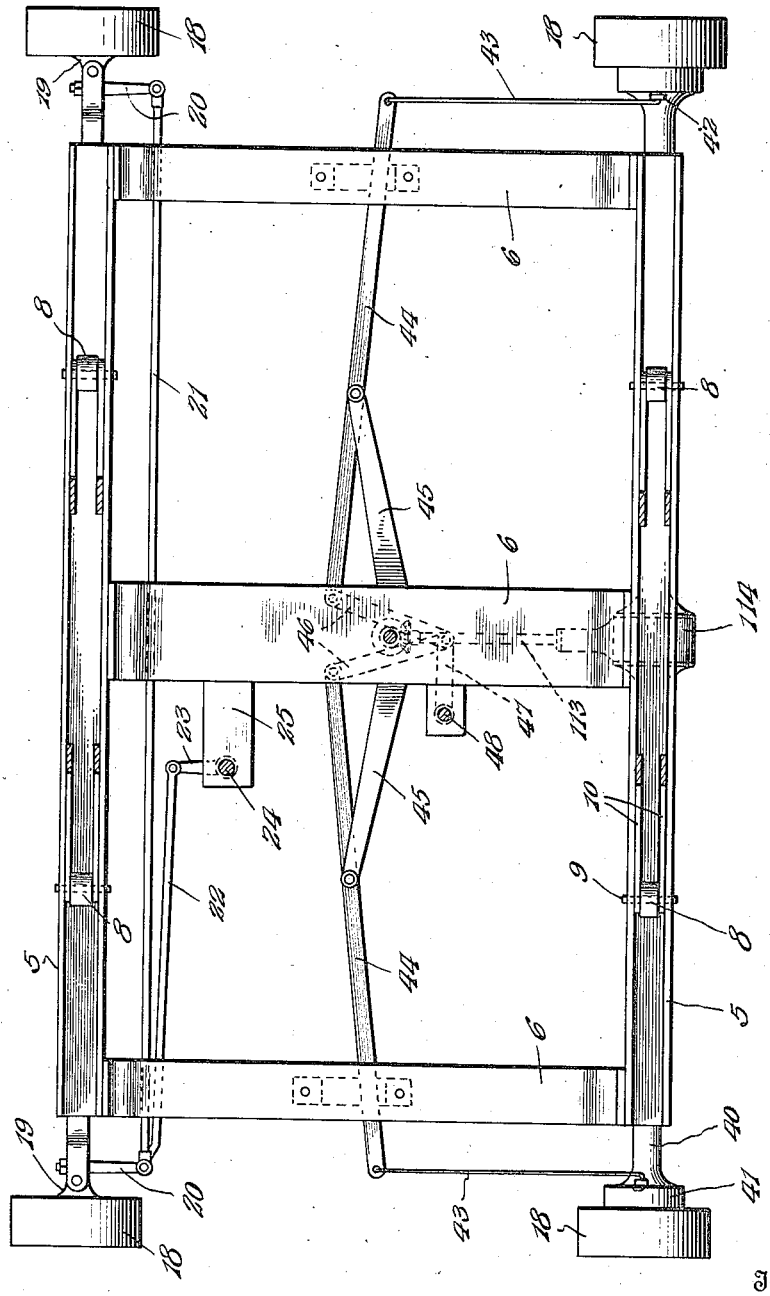
Figure 2 is a horizontal section on the line 2—2 of Figure 1.

The rollers 18, at one side of the truck, are mounted upon knuckles 19, as indicated in Figure 2, and radius rods 20 extend inwardly from said knuckles and are connected by a link or connecting rod 21, as shown, and in accordance with a well-known practice. A steering link 22 is pivotally connected at one end with the link or connecting rod 21 and at its opposite end is connected to a crank 23 at the lower end of a steering shaft 24. This shaft 24 is mounted vertically in any convenient manner upon the truck and is illustrated as having its lower end fitted in a bracket or lug 25 extending from the central cross bar 6 and its upper portion fitted in a bracket 26 secured to one of the beams 15. Bevel gearing, indicated at 27, connects the upper end of the shaft 24 with a forwardly extending shaft 28 rotatably supported in any convenient manner upon the upper portion of the truck, the forward extremity of this shaft 28 being square, or angular in cross section, as shown at 29, whereby it may be readily engaged with a socket at the rear end of an operating rod. The usual steering column of a motor vehicle is indicated conventionally at 30, and, in the present instance, this column is hollow so as to axially receive a steering rod 31 which extends beyond the upper and lower ends respectively of the column, as clearly shown in Figure 1. An auxiliary steering wheel 32 is secured to the upper end of the auxiliary steering rod 31 and the lower end of this steering rod is connected by a worm gearing, indicated at 33, with a transverse shaft 34 suitably supported on the chassis of the vehicle and connected at its opposite end, through bevel gearing 35, with a vertical shaft 36. Said shaft 36 is connected by bevel gearing 37 with a rearwardly extending shaft or rod 38 provided at its rear end with a socket of angular cross section to engage over the angular end 29 of the shaft 28 so that, when the wheel 32 is turned, the motion will be transmitted through the described connections to the rollers 18 and said rollers will be turned to any desired angular position to guide the vehicle sidewise into a selected location.

The rollers 18, at the opposite side of the truck, are mounted upon a driving axle 39 which is fitted in an axle housing 40 similar in design to the rear axle housing of motor vehicles. At the ends of the axle housing are brake drums which are secured to the respectively adjacent rollers and cooperate with collapsible brake bands so as to arrest the travel of the vehicle when desired. The brake drums and bands are indicated at 41, and I have also indicated conventionally short levers or cranks 42 connected with the brake bands so as to effect operation of the brakes as desired. The cranks or levers 42 are connected by links 43 with brake levers 44 fulcrumed between their ends upon brackets or arms 45 forming a part of the truck, the inner ends of the levers 44 being connected by links 46 with a crank 47 on the lower end of a brake shaft 48 which is suitably supported in a vertical position upon the truck. The upper end of the shaft 48 is connected by a link 49 to a brake rod 50 which extends longitudinally of the vehicle and is connected at its front end through an arm or bracket 51 with the usual brake rod 52 mounted on the vehicle chassis and controlled by the ordinary foot lever 53. The shafts 24 and 48, as shown clearly in Figure 3, are of a telescopic formation so that they will be extended as the truck is lowered and will be contracted as the truck is raised relative to the vehicle so that they will readily conform to the adjustment of the truck and the vehicle while maintaining the operative connection between the working parts. It will be understood that the telescoping sections of the shaft will be provided with interengaging lugs or other devices so that they cannot become separated and render the device inoperative. As such elements are well-known in various arts, I have deemed it unnecessary to illustrate the same in detail in the accompanying drawings.

Figure 10:
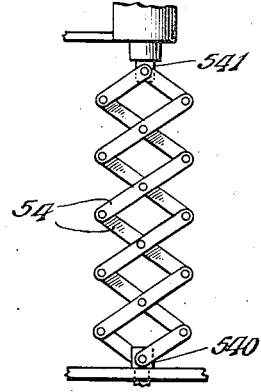
Figure 10 is a detail view of a lazy tongs which may be employed as an extensible shaft.

While the telescopic shafts illustrated and described are desirable for compactness and direct action, the invention is not limited to the use of such shafts and, in Figure 10, I have illustrated a lazy tongs which may be substituted for the shafts without affecting the efficiency or utility of the mechanism. This lazy tongs consists of a series of links 54 pivoted together at their points of meeting, the lower links being pivoted to a stub shaft 540 journaled in a fixed member of the truck while the upper links are likewise pivoted to the lower end of a motion-transmitting shaft 541. These links will automatically fold together as the truck is raised and will automatically unfold or extend as the truck is lowered and will rotate with the stub shafts as will be understood.

Secured upon the chassis of the vehicle, in any convenient manner, at the rear of the transmission housing 4, is a gear case 55. The travel of the nuts 12 must, of course, be arrested when the truck has been fully lowered and also when it has been fully raised, and for this purpose I have provided mechanism which is best shown in Figures 4, 5 and 6. Mounted in the gear case 55 is a longitudinal shaft 56 which extends through the rear end of the gear case and is connected by bevel gearing, shown at 57, with a transverse shaft 58 mounted in suitable bearings, indicated at 59, upon the beams 15 and equipped at its ends with worms 60 meshing with worm gears on the ends of the shafts or rods 13 so that the motion of the shaft 56 will be utilized to operate said threaded rods. Within the gear case, a gear wheel 61 is secured upon the front end of the shaft 56, and alined with the shaft and having its rear end fitted axially within said gear 61 is a second shaft 62, the forward end of said shaft 62 being journaled in a bearing post 63 rising from the bottom of the gear case. A gear wheel 64 is secured upon the front end of the shaft 62 and, between its ends, a gear wheel 65 is fitted upon said shaft so that it may rotate independently of the shaft but is held by a detent 66, working in an annular groove 67 in the shaft, against movement along the shaft. The opposed faces of the gears 61 and 65 are formed with clutch members 68 and 69, respectively, which are adapted to be engaged by corresponding and mating clutch elements 70 and 71 formed at the ends of a sleeve 72 which is splined upon the shaft 62 so that it may slide endwise thereon, as shown. This sleeve 72 is provided adjacent its ends with annular flanges 73, the purpose of which will presently appear. Disposed below the shaft 62 is a countershaft 74 which is mounted in suitable bearings provided therefor on the walls of the gear case and secured upon this shaft, at the ends of the same, are gears 75 and 76 which mesh respectively with the gears 61 and 65. It will be seen at once that the gears 75 and 76 are constantly in mesh with the gears 61 and 65, respectively, and the shaft 56 will be rotated directly by the gear 61 or through the train 65, 76, 75, 61, accordingly as the clutch sleeve 72 is engaged with the clutch 68 or the clutch 69. When the truck is at rest, the clutch sleeve 72 will be out of engagement with both the clutches 68 and 69 and will be held in this neutral position by a lever 77 which is pivoted at one end, as shown in Figure 6, upon a lug 78 on a wall of the gear case and has its opposite end resting upon a lug 79 on a side wall of the gear case, the intermediate portion of the lever passing between the flanges 73. Said lug 79 is formed with a recess 80 to receive the free end of the lever 77 and an opening is formed through said end of the lever to receive a latch pin 81, as shown in Figure 6, whereby the lever will be normally held in the neutral position. The lever is also provided between its ends with an arcuate slot, indicated at 82, and this slot receives a stud 83 rising from a block 84 which is disposed below the lever and is carried by the free end of a pin 85 which is fitted at its opposite headed end, as shown at 86, in a recess in the side of the lug 79 so as to rock therein. An expansion spring 87 is coiled around the pin 85 between the head 86 thereof and the block 84 and tends constantly to move the block inwardly, but movement of the block along the pin is prevented by the engagement of the stud 83 with the arcuate slot 82, as will be understood. The stud is prevented from dropping through the slot by any suitable means such as a pin 88, shown in Figure 6. The lever 77 is preferably formed with arcuate edges between the flanges 73 so as to reduce frictional wear and accommodate the varying angular relation of the lever to the flanges as the lever is oscillated. The lever is also formed with an enlargement 89 above the block 84 so as to provide for a sufficient length of the slot 82 to permit the proper operation of the parts. Mounted in suitable supports upon the gear case, below the block 84, is a sliding bar 90 and upon said bar are secured spaced collars 91 which are located at opposite sides of and in engagement with the block 84 and are adjustably secured upon the bar by set screws or similar devices. The forward end of the bar 90 is connected by a link 92 with one end of a transverse lever 93 which is fulcrumed between its ends adjacent the front end of the gear case and is preferably equipped with a pinion 94 at the end remote from the link 92. The pinion 94 meshes with a segmental rack 95 formed on the end of a lever or rocking arm 96 which is fulcrumed in the gear case at the side of the same more remote from the bar 90. One end of the rocking arm or lever 96 extends through a slot or opening 97 provided therefor in the side of the gear case and has pivotal and slidable connection with a collar 98 fitted upon a slide bar 99 mounted in suitable supports on the outer side of the gear case and extending parallel with the bar 90. One end of the slide bar 99 is connected by a link or rigid arm 100 with the adjacent nut 12 so that, as the rods or shafts 13 are operated and the nuts 12 caused to travel, the bar 99 will be likewise caused to travel through the collar 98. Secured upon the slide bar 99, at opposite sides of the collar 98, are stop collars 101 which are set to impinge upon the collar 98 when the nuts 12 have reached the limits of their movement so that said collar 98 will be moved through a short distance with the slide bar, thereby rocking the arm 96 and causing the lever 93 to rock and actuate the slide bar 90, one or the other collar 91 being thereby caused to act upon the block 84. The latch pin 81 is normally held up in engagement with the lever 77 by an expansion spring 102 disposed about the pin within a recess 103 in the lug 79, the spring bearing at one end against an abutment 104 upon the pin and, at its opposite end, upon a plug 105 which closes the lower end of the recess 103. The pin is engaged at its lower extremity with an arm or crank 106 extending from a rock shaft 107 which extends through the forward end of the gear case and at its forward end is provided with a crank 108 which is pivoted at its free end to the lower end of a pedal or push rod 109 which is slidably mounted in the floor of the vehicle and is so located that it may be conveniently operated by the foot of the chauffeur.

When it is desired to raise or lower the truck, the push rod 109 is pressed downwardly thereby rocking the shaft 107 so that the arm 106 thereon will be swung downwardly and the pin 81 will be withdrawn from engagement with the lever 77, whereupon the spring 87 will be free to swing the block 84 in either direction. Assuming the elements to be in the positions shown in Fig. 4, the spring 87 is exerting pressure upon the block 84 and, through the block, upon the upper collar 91 whereby the collar and the slide 90 tend to move toward the top of the figure. As soon as the latch 81 is released, the force of the spring 87 snaps the block 84 and the lever 77 upward so that the clutch 69, 71 will be closed and rotation will be imparted to the shaft 56 through the train of gears 65, 76, 75 and 61. When the nut 12 reaches the limit of its travel, the slide 90 will be actuated as described to shift the lever 77 and the block 84 toward the bottom of the figure. This action will open the clutch 69, 71 and will set the parts to close the clutch 68, 70 when the mechanism is to again operate. The latch 81 will automatically engage the lever 77 when the lever reaches the central or neutral position, but the block 84 will travel slightly past the neutral or dead center under its own momentum and the influence of the spring 87, the slot 82 accommodating the movement of the stud 83 and there being a slight play between the block and the collars 91.

Disposed within the gear case 55 is the upper end of a vertical shaft 110 which extends through the bottom of the gear case and is of telescopic construction below the gear case, as indicated at 111 in Figure 3. The lower end of this shaft 110 is connected by bevel gearing, indicated at 112, with a propeller shaft 113 extending therefrom and connected operatively, through an ordinary differential 114, with the axle 39 so that power applied to the shaft 110 will be utilized to rotate the corresponding rollers 18 and effect travel of the truck and the vehicle supported thereby. At the upper end of the shaft 110 is secured a gear wheel 115 meshing with a bevel gear 116 secured on the rear end of a shaft 117 journaled in suitable bearings within the gear case 55, as shown clearly in Figure 4. A gear 118 is secured on the shaft 117 between its ends and is adapted, at times, to receive motion from a shaft 119 which is extended through the front end of the gear case 55 and has its front extremity suitably shaped to be engaged in a socket 120 formed on the end of a shaft 121 which is carried in an extension 122 of the transmission housing 4 and is located at one side of the propeller shaft of the vehicle, indicated at 123 in Figure 7, the propeller shaft being alined with the engine shaft which is indicated at 124 in Figure 8. In Figure 8, I have shown the usual cluster gear 125 which forms a part of the regular transmission, and within the transmission housing, at one side of the cluster gear and parallel therewith, is a shaft 126 which constitutes the main shaft of the auxiliary transmission forming a part of my invention. This shaft 126 is equipped at its rear end with a bevel gear 127 meshing with a bevel gear 128 secured upon the lower end portion of a shaft 129 mounted vertically in the extension case 122. A bevel gear 130 is secured upon the upper end of the shaft 129 and meshes with a bevel gear 131 which is secured upon the shaft 121 so that the motion of the shaft 126 will be transmitted to the shaft 121 and thence to the shaft 119. The shaft 126 is equipped with gears 132, 133 and 134, the gear 132 being loose and meshing with a gear 200 of the main transmission to be rotated whenever the transmission shaft is rotated, while the gears 133 and 134 are splined to move along the shaft but rotate therewith and provided with grooved hubs to be engaged by shifting yokes or selectors. Below said shaft 126 is a countershaft 135 carrying gears 136 and 137 having a hub in common, with the gear 136 meshing with the cluster gear 125. By meshing the gear 134 with the smaller member of the gear 125, the shaft 126 will be driven at low speed while meshing gear 134 with the gear 137 will reverse the shaft 126. If the gear 133 be put in mesh with the larger member of the cluster gear, the shaft 126 will be driven at second speed while if the gear 133 be engaged directly with the gear 132, the shaft will be driven in high. It will be understood that the gear 133 has both external and internal teeth so that it may be engaged with either the gear 125 or the gear 132. The gears 133 and 134 are shifted through selectors 138 of well-known form controlled by a gear shift lever 139. The gear shift lever may be set at will to shift the gears of the usual transmission of the automobile or to shift the gears of my auxiliary transmission. For this purpose a twin head 140 is provided upon the transmission housing 4 and has mounted therein two selector heads 141 and 142, each of which has a socket in its upper end, as shown clearly in Figure 7. The gear shift lever 139 is provided at its lower end with a ball or spherical head 143 which seats in a lug or rest 144 provided therefor on the head 140 midway the twin members thereof and equipped with a cap 145 whereby the lever is retained in place. The selector heads 141 and 142 are mounted in the head 140 so that they may have universal movement and work through slots of well-known H-form to permit the selectors connected respectively therewith to be shifted to engage the proper gears and to shift said gears into the proper position. The shift lever 139 is provided with the usual ball or handle 146 at its upper end and upon the lever is slidably mounted a sleeve 147 having finger rests 148 at its upper end, and an expansion spring 149 is coiled around the upper end of the lever to bear at its opposite ends upon the finger rests 148 and the ball 146, respectively, so that the sleeve 147 will be yieldably held in its lowered position. A longitudinal slot 150 is formed in the sleeve 147 and a set screw 151 is inserted through said slot into the lever so as to limit the sliding movement of the sleeve. At its lower end, the sleeve is equipped with a cross head 152 which is provided at each end with a depending lug 153 adapted to enter the corresponding socket in the upper end of the adjacent selector head. Normally, the cross head 152 will be engaged in the selector head 141 which is a part of the usual transmission mechanism but when it is desired to raise the vehicle and effect travel of the truck, the sleeve 147 is drawn upwardly so as to release the cross head from the selector head 141 after which the lever is rocked so that the cross head will be engaged with the selector head 142 and thereby set to operate the auxiliary transmission.

A sleeve 154 is mounted on the shaft 119 and is slidable thereon but is constrained to rotate therewith and this sleeve carries a gear 155 which may be set to mesh with the gear 64 on the shaft 62 or with the gear 118 on the shaft 117. To effect the shifting of the gear and the sleeve, a rod 156 is slidably mounted in the gear case 55 and is engaged at its inner end in an annular groove 157 in the sleeve 154. This rod 156 is pivoted at its forward end to the lower end of a hand lever 158 which is mounted in the floor of the vehicle and is located adjacent the pedal 109 so that it may be easily and conveniently manipulated by the chauffeur.

The shaft 119 is rotated by power transmitted thereto through the auxiliary transmission, as has been described, and the gear 155 is shifted to engage the gear 64 or the gear 118, accordingly as the power is to be utilized to raise and lower the truck or to rotate the rollers 18 and thereby effect travel of the truck. When the power is applied to the shaft 62, through the gear 64, the pedal 109 is depressed so that the latch pin 81 will be withdrawn from the lever 77 whereupon the spring 87 expands and throws the block 84 in the proper direction to engage the clutches 68, 70 or 69, 71, whereupon the shaft 56 will be rotated so as to operate the lazy tongs and lower the truck and effect relative raising of the vehicle. When the gear 155 is shifted into mesh with the gear 118 the shaft 119 will be rotated so that the power will be applied to the axle 40 and the rollers 18 rotated to effect travel of the truck. The truck may be steered through manipulation of the steering wheel 32 and when the vehicle has been brought into the desired position, application of the foot brake lever 53 will apply the brakes and arrest the travel of the truck, whereupon the transmission may be thrown into neutral and the engine stopped.

From the foregoing description, taken in connection with the accompanying drawings, it will be seen that I have provided a very compact mechanism whereby the body and chassis of a motor vehicle may be readily raised by use of the power of the engine mounted on the vehicle and, when raised, may be easily shifted into a desired position or held stationary as desired. The mechanism will be found highly efficient and advantageous when it becomes necessary, for any reason, to change a wheel or a tire of the vehicle or when it is desired to lubricate the chassis or some other parts of the vehicle. When the vehicle is raised and supported by the truck, it may be easily shifted sidewise and thereby parked in a restricted space or, when so arranged, may be driven over an open field. It will be understood that, while I have shown and described one embodiment of the invention, many variations in the minor details of construction and arrangement of the parts may be adopted without departing from the spirit or scope of the invention as the same is defined in the following claims. In Figure 1, the extension case 122 is shown with an open side so as to disclose the gears therein, but it is to be understood that the gear cases will all be entirely closed so that the gears may run in lubricant.

Having thus described the invention, I claim:

1. Apparatus for the purpose set forth comprising a truck adapted to be secured upon the chassis of a motor vehicle, means operated by the power plant of the vehicle for raising or lowering the truck, the vehicle being suspended solely by the truck when the truck is lowered, said truck being provided with pairs of wheels, one pair of wheels receiving power from the power plant of the vehicle to effect travel of the truck and another pair of said wheels being pivotally mounted for steering the truck, a steering rod fitted through the steering column of the vehicle, a steering wheel on the upper end of said rod above the steering wheel on the column, and gearing connecting the lower end of said steering rod with the pivoted wheels of the truck whereby to operate the same.

2. Apparatus for the purpose set forth comprising a truck adapted to be mounted upon the chassis of a motor vehicle, the truck being provided with wheels whereby it may be caused to travel, means operated by the power plant of the vehicle for raising or lowering the truck, brakes cooperating with some of the wheels of the truck, and means connected with the brake lever of the vehicle for operating the brakes on the truck.

3. Apparatus for the purpose set forth comprising a truck adapted to be mounted upon the chassis of a motor vehicle and including upper and lower side bars, the upper side bars being connected with the chassis of the vehicle and the lower side bars being provided with longitudinal slots, pairs of pivotally connected upper and lower links disposed between the upper and lower side bars and having their lower ends equipped with rollers to travel on the lower side bars, the links of the pairs of links being pivoted together at their points of intersection, nuts secured to the upper ends of the upper links and disposed on the upper side bars, threaded rods extending through and engaged with said nuts and journaled in bearings on the upper side bars, said rods being relatively reversely threaded at their opposite ends whereby the nuts will be caused to travel toward or from each other, means for rotating said rods whereby to effect the travel of the nuts and thereby fold or extend the links to raise or lower the truck relative to the vehicle, and means for arresting the rotation of the threaded rods at either limit of the movement of the links.

4. Apparatus for the purpose set forth comprising a truck adapted to be mounted upon the chassis of a motor vehicle, means whereby the truck may be raised or lowered, said means including a shaft rotatably mounted over the truck, gears on said shaft having clutch elements on their opposed faces, a sleeve slidably mounted on the shaft between said gears and having clutch ends adapted to engage the respective clutch elements on the gears, a lever fulcrumed at one side of said shaft and extending across the shaft and engaged with said sleeve, means engageable with the free end of the lever for normally holding said lever in a neutral position, means for releasing said means, spring actuated means operable upon release of the first-mentioned means for automatically rocking the lever and shifting the sleeve to engage a selected clutch element, and means for rotating said shaft in a desired direction and at a desired speed.

5. Apparatus for the purpose set forth comprising a truck adapted to be mounted upon the chassis of a motor vehicle, means for raising and lowering the truck including lazy tongs, a shaft operable from the power plant of the vehicle, threaded rods and nuts for effecting collapse or extension of the lazy tongs as said shaft is rotated, a slide connected with one of the nuts, gears upon said shaft, a clutch sleeve mounted on the shaft between the gears and adapted to engage either of said gears, a lever fulcrumed at one side of the shaft and extending across the same and engaged with said sleeve, a latch pin normally holding the lever in neutral position, means for releasing the latch pin, a second slide, operative connections between the slides whereby the second slide will be actuated when the lazy tongs have been fully extended or fully collapsed, means for shifting the lever to effect engagement between the sleeve and one of the gears on said shaft when the latch pin has been withdrawn, and means on the second slide for shifting the lever to disengage the sleeve from the gear when the lazy tongs have reached the limit of their movement.

6. Apparatus for the purpose set forth comprising a truck adapted to be secured upon the chassis of a motor vehicle, means operated by power from the vehicle to raise and lower the truck, said means including threaded rotatable rods, nuts mounted on said rods and a shaft geared to said rods, a slide connected with one of the nuts, a rocking arm, means on the slide to engage an end of said arm and rock the arm at the limit of raising or lowering movement of the truck, a second slide, a second rocking arm engaged at one end with the first-mentioned rocking arm and connected at the other end with the second slide, spaced gears on the shaft, a clutch sleeve splined on the shaft between the gears, a gear train connecting said spaced gears, a lever extending across and engaged with the clutch sleeve, means for holding said lever at rest in neutral position, and means controlled by the second slide for shifting the lever and clutch upon release of said holding means.

7. Apparatus for the purpose set forth comprising a truck adapted to be secured upon the chassis of a motor vehicle, means operated by power from the vehicle to raise and lower the truck, means for steering the truck, and means operated by power from the vehicle for effecting travel of the truck, said steering means and travel-effecting means each including an extensible shaft journaled in the top and bottom of the truck.

8. Apparatus for the purpose set forth comprising a truck adapted to be mounted upon the chassis of a motor vehicle and shifted vertically, ground engaging wheels carried by said truck, an auxiliary transmission receiving motion from the vehicle transmission, said auxiliary transmission including an auxiliary propeller shaft, a shaft adapted to be coupled to said auxiliary propeller shaft, trains of gearing at opposite sides of said shaft, and a slidable gear on said shaft selectively engaging the trains of gearing whereby to raise or lower the truck or to impart rotation to the wheels and effect travel of the truck.

9. Apparatus for the purpose set forth comprising a truck adapted to be mounted upon the chassis of a motor vehicle and shifted vertically, ground engaging wheels carried by said truck, an auxiliary transmission receiving motion from the transmission of the vehicle, a shaft rotatably mounted over the truck at the rear of the vehicle transmission whereby to rotate at a selected speed and in forward or reverse directions, gearing operable for raising or lowering the truck, gearing for transmitting rotation to said wheels and effecting travel of the truck, a gear on the first-mentioned shaft, and means for shifting said gear whereby to operatively connect the shaft with the gearing for effecting travel of the truck or the gearing for raising or lowering the truck.

BERTHA McCAFFERTY TRUITT.